US009666191B1

(12) United States Patent
Bakish (10) Patent No.: US 9,666,191 B1
(45) Date of Patent: *May 30, 2017

(54) LASER-BASED SYSTEM AND OPTICAL MICROPHONE HAVING INCREASED BANDWIDTH

(71) Applicant: VocalZoom Systems Ltd., Yokneam Illit (IL)

(72) Inventor: Tal Bakish, Modi'in (IL)

(73) Assignee: VOCALZOOM SYSTEMS LTD., Yokneam Illit (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/072,382

(22) Filed: Mar. 17, 2016

(51) Int. Cl.
*H04R 3/00* (2006.01)
*G10L 15/25* (2013.01)
*G08C 23/04* (2006.01)
*H04R 23/00* (2006.01)

(52) U.S. Cl.
CPC .............. *G10L 15/25* (2013.01); *G08C 23/04* (2013.01); *H04R 3/005* (2013.01); *H04R 23/008* (2013.01); *H04R 2410/03* (2013.01)

(58) Field of Classification Search
CPC ....................................................... H04R 3/00
See application file for complete search history.

(56) References Cited

U.S. PATENT DOCUMENTS

| | | | | | |
|---|---|---|---|---|---|
| 4,003,053 | A | * | 1/1977 | Mengel | G01S 13/342 342/128 |
| 5,479,423 | A | * | 12/1995 | Tanikawa | H04B 10/2912 359/337 |
| 6,014,239 | A | * | 1/2000 | Veligdan | H04B 10/114 381/170 |
| 6,476,681 | B1 | * | 11/2002 | Kirkpatrick | H03L 7/093 331/1 A |
| 7,775,113 | B2 | | 8/2010 | Bakish | |
| 8,286,493 | B2 | | 10/2012 | Bakish | |
| 8,949,118 | B2 | | 2/2015 | Avargel et al. | |
| 2005/0096917 | A1 | * | 5/2005 | Kjorling | G10L 19/07 704/500 |
| 2012/0099612 | A1 | * | 4/2012 | Deubel | G02B 5/1861 372/26 |
| 2012/0177099 | A1 | * | 7/2012 | Reining | H04R 3/00 375/239 |

(Continued)

*Primary Examiner* — Olisa Anwah
(74) *Attorney, Agent, or Firm* — Eitan, Mehulal & Sadot (57) ABSTRACT

Laser-based system and optical microphone having increased bandwidth. The system includes a laser microphone to transmit a laser beam towards a human speaker; to receive an optical feedback signal reflected back from the human speaker; and to perform self-mixing interferometry. An optical feedback signal bandwidth enhancer improves the bandwidth of the optical feedback signal, to improve the quality of remote speech detection that is based on the optical feedback signal. The bandwidth enhancement utilizes takes into account one or more of: the identity of the face-region hit by the laser beam; the skin color or shade; obstruction of the skin by hair or by accessories; ability to allocate increased processing resources for processing of the optical feedback signal; ability to modify modulation frequency of the optical feedback signal; Signal to Noise Ratio (SNR) estimation; bandwidth estimation; acoustic-optical transmission channel estimation; or other suitable parameters.

20 Claims, 2 Drawing Sheets

(56) References Cited

U.S. PATENT DOCUMENTS

| | | | |
|---|---|---|---|
| 2012/0189312 A1* | 7/2012 | Maryfield | H04B 10/1143 398/108 |
| 2014/0022113 A1* | 1/2014 | Nogueira-Nine | G01S 7/412 342/128 |
| 2014/0247847 A1* | 9/2014 | Cox | H01S 5/06817 372/38.01 |
| 2015/0331090 A1* | 11/2015 | Jeong | G01S 7/35 342/83 |
| 2015/0365753 A1* | 12/2015 | Kropp | H04R 7/06 381/172 |
| 2016/0302010 A1* | 10/2016 | Sebastian | H04R 23/008 |

* cited by examiner

LASER-BASED SYSTEM AND OPTICAL MICROPHONE HAVING INCREASED BANDWIDTH

FIELD OF THE INVENTION

The present invention relates to the field of optical microphones.

BACKGROUND OF THE INVENTION

Millions of people users worldwide utilize a variety of electronic devices that may receive, capture or otherwise process audio signals. For example, cellular phones and smartphones comprise an audio microphone, allowing a user to conduct a telephone call with a remote user. Similarly, a smartphone typically comprises an audio microphone and a video camera, allowing the user to record an audio/video clip. Additionally, many laptop computers as well as tablets are typically equipped with an audio microphone able to capture audio.

Unfortunately, an audio microphone typically capture a desired audio signal (e.g., a voice of a human speaker) together with background noise, interferences, ambient noises, environmental noises, and/or audio from other non-desired sources.

SUMMARY OF THE INVENTION

Some embodiments of the present invention may provide systems, devices, and methods that comprise or utilize a laser microphone, a laser-based microphone and/or an optical microphone.

In some embodiments, an optical microphone or a laser microphone may transmit a laser beam towards a face area of a human speaker; and may receive reflected optical feedback that may be reflected from the face area of the human speaker, and particularly from face-regions that vibrate while the human speaker speaks. A self-mix (SM) chamber, a self-mix interferometer unit, a vibrometer, or other suitable component may analyze the received optical chamber, in order to remotely determine or to estimate an audio signal uttered by the human speaker, based on the received optical feedback.

The optical-based estimations may be utilized by themselves in order to estimate the uttered audio or the uttered speech. In some embodiments, the optical microphone or laser microphone may be part of a hybrid sensor or a hybrid system, that may optionally comprise also one or more acoustic microphone(s) that capture audio; and the optical feedback captured by the optical microphone may be utilized in order to improve or enhance or filter the audio signal, and/or in order to reduce or cancel noise(s) in the audio signal.

In some embodiments, the system or the sensor may identify which particular face-region of the human speaker is "hit" by a transmitted optical beam or laser beam, and reflects back the optical feedback; and may take into account the identification of that particular face-region in order to improve or enhance the quality of the optical feedback analysis results.

Some embodiments may provide a laser-based system and optical microphone having increased bandwidth. The system includes a laser microphone to transmit a laser beam towards a human speaker; to receive an optical feedback signal reflected back from the human speaker; and to perform self-mixing interferometry. An optical feedback signal bandwidth enhancer improves the bandwidth of the optical feedback signal, to improve the quality of remote speech detection that is based on the optical feedback signal. The bandwidth enhancement utilizes takes into account one or more of: the identity of the face-region hit by the laser beam; the skin color or shade; obstruction of the skin by hair or by accessories; ability to allocate increased processing resources for processing of the optical feedback signal; ability to modify modulation frequency of the optical feedback signal; Signal to Noise Ratio (SNR) estimation; bandwidth estimation; acoustic-optical transmission channel estimation; and/or other suitable parameters.

The present invention may provide other and/or additional advantages and/or benefits.

DETAILED DESCRIPTION OF SOME EMBODIMENTS OF THE INVENTION

The terms "laser" or "laser transmitter" as used herein may comprise or may be, for example, a stand-alone laser transmitter, a laser transmitter unit, a laser generator, a component able to generate and/or transmit a laser beam or a laser ray, a laser drive, a laser driver, a laser transmitter associated with a modulator, a combination of laser transmitter with modulator, a combination of laser driver or laser drive with modulator, or other suitable component able to generate and/or transmit a laser beam.

The term "acoustic microphone" as used herein, may comprise one or more acoustic microphone(s) and/or acoustic sensor(s); or a matrix or array or set or group or batch or arrangement of multiple such acoustic microphones and/or acoustic sensors; or one or more sensors or devices or units or transducers or converters (e.g., an acoustic-to-electric transducer or converter) able to convert sound into an electrical signal; a microphone or transducer that utilizes electromagnetic induction (e.g., a dynamic microphone) and/or capacitance change (e.g., a condenser microphone) and/or piezoelectricity (e.g., a piezoelectric microphones) in order to produce an electrical signal from air pressure variations; a microphone that may optionally be connected to, or may be associated with or may comprise also, a pre-amplifier or an amplifier; a carbon microphone; a carbon button microphone; a button microphone; a ribbon microphone; an electret condenser microphone; a capacitor microphone; a magneto-dynamic microphone; a dynamic microphone; an electrostatic microphone; a Radio Frequency (RF) condenser microphone; a crystal microphone; a piezo microphone or piezoelectric microphone; and/or other suitable types of audio microphones, acoustic microphones and/or sound-capturing microphones.

The term "laser microphone" as used herein, may comprise, for example: one or more laser microphone(s) or sensor(s); one or more laser-based microphone(s) or sensor (s); one or more optical microphone(s) or sensor(s); one or more microphone(s) or sensor(s) that utilize coherent electromagnetic waves; one or more optical sensor(s) or laser-based sensor(s) that utilize vibrometry, or that comprise or utilize a vibrometer; one or more optical sensor(s) and/or laser-based sensor(s) that comprise a self-mix module, or that utilize self-mixing interferometry measurement technique (or feedback interferometry, or induced-modulation interferometry, or backscatter modulation interferometry), in which a laser beam is reflected from an object, back into the laser, and the reflected light interferes with the light generated inside the laser, and this causes changes in the optical and/or electrical properties of the laser, and information about the target object and the laser itself may be obtained by analyzing these changes.

The terms "vibrating" or "vibrations" or "vibrate" or similar terms, as used herein, refer and include also any other suitable type of motion, and may not necessarily require vibration or resonance per se; and may include, for example, any suitable type of motion, movement, shifting, drifting, slanting, horizontal movement, vertical movement, diagonal movement, one-dimensional movement, two-dimensional movement, three-dimensional movement, or the like.

In some embodiments of the present invention, which may optionally utilize a laser microphone, only "safe" laser beams or sources may be used; for example, laser beam(s) or source(s) that are known to be non-damaging to human body and/or to human eyes, or laser beam(s) or source(s) that are known to be non-damaging even if accidently hitting human eyes for a short period of time. Some embodiments may utilize, for example, Eye-Safe laser, infra-red laser, infra-red optical signal(s), low-strength laser, and/or other suitable type(s) of optical signals, optical beam(s), laser beam(s), infra-red beam(s), or the like. It would be appreciated by persons of ordinary skill in the art, that one or more suitable types of laser beam(s) or laser source(s) may be selected and utilized, in order to safely and efficiently implement the system and method of the present invention. In some embodiments, optionally, a human speaker or a human user may be requested to wear sunglasses or protective eye-gear or protective goggles, in order to provide additional safety to the eyes of the human user which may occasionally be "hit" by such generally-safe laser beam, as an additional precaution.

In some embodiments which may utilize a laser microphone or optical microphone, such optical microphone (or optical sensor) and/or its components may be implemented as (or may comprise) a Self-Mix module; for example, utilizing a self-mixing interferometry measurement technique (or feedback interferometry, or induced-modulation interferometry, or backscatter modulation interferometry), in which a laser beam is reflected from an object, back into the laser. The reflected light interferes with the light generated inside the laser, and this causes changes in the optical and/or electrical properties of the laser. Information about the target object and the laser itself may be obtained by analyzing these changes. In some embodiments, the optical microphone or laser microphone operates to remotely detect or measure or estimate vibrations of the skin (or the surface) of a face-point or a face-region or a face-area of the human speaker (e.g., mouth, mouth-area, lips, lips-area, cheek, nose, chin, neck, throat, ear); and/or to remotely detect or measure or estimate the direct changes in skin vibrations; rather than trying to measure indirectly an effect of spoken speech on a vapor that is exhaled by the mouth of the speaker, and rather than trying to measure indirectly an effect of spoken speech on the humidity or relative humidity or gas components or liquid components that may be produced by the mouth due to spoken speech.

The present invention may be utilized in, or with, or in conjunction with, a variety of devices or systems that may benefit from noise reduction and/or speech enhancement; for example, a smartphone, a cellular phone, a cordless phone, a video conference system or device, a tele-conference system or device, an audio/video camera, a web-camera or web-cam, a landline telephony system, a cellular telephone system, a voice-messaging system, a Voice-over-IP system or network or device, a vehicle, a vehicular dashboard, a vehicular audio system or microphone, a navigation device or system, a vehicular navigation device or system, a mapping or route-guidance device or system, a vehicular route-guidance or device or system, a dictation system or device, Speech Recognition (SR) device or module or system, Automatic Speech Recognition (ASR) module or device or system, a speech-to-text converter or conversion system or device, a laptop computer, a desktop computer, a notebook computer, a tablet, a phone-tablet or "phablet" device, a gaming device, a gaming console, a wearable device, a smart-watch, a Virtual Reality (VR) device or helmet or glasses or headgear, an Augmented Reality (AR) device or helmet or glasses or headgear, a device or system or module that utilizes speech-based commands or audio commands, a device or system that captures and/or records and/or processes and/or analyzes audio signals and/or speech and/or acoustic signals, and/or other suitable systems and devices.

Some embodiments of the present invention may provide or may comprise a laser-based device or apparatus or system, a laser-based microphone or sensor, a laser microphone or sensor, an optical microphone or sensor, a hybrid acoustic-optical sensor or microphone, a combined acoustic-optical sensor or microphone, and/or a system that comprises or utilizes one or more of the above.

Figure 1A:
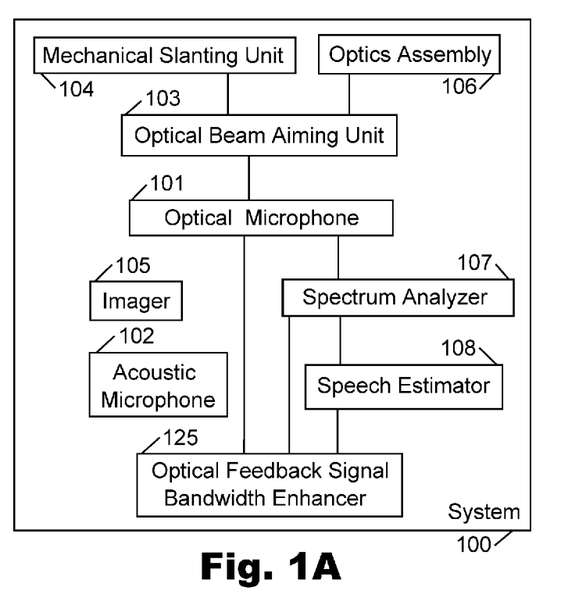
FIG. 1A is a schematic illustration of a system, in accordance with some demonstrative embodiments of the present invention.

Reference is made to FIG. 1A, which is a schematic block-diagram illustration of a system 100, in accordance with some demonstrative embodiments of the present invention.

System 100 may comprise, for example, an optical microphone 101 able to transmit an optical beam (e.g., a laser beam) towards a target 199 (e.g., a face of a human speaker), and able to capture and analyze the optical feedback that is reflected from the target 199, particularly from vibrating regions or vibrating face-regions or face-portions of the human speaker. The optical microphone 101 may be or may comprise or may utilize a Self-Mix (SM) chamber or unit, an interferometry chamber or unit, an interferometer, a vibrometer, a targeted vibrometer, or other suitable component, able to analyze the spectrum of the received optical signal with reference to the transmitted optical beam, and able to remotely estimate the audio or speech or utterances generated by the target 199 (e.g., the human speaker).

Optionally, system 100 may comprise an acoustic microphone 102 or an audio microphone, which may capture audio. Optionally, the analysis results of the optical feedback may be utilized in order to improve or enhance or filter the captured audio signal; and/or to reduce or cancel noise(s) from the captured audio signal. Optionally, system 100 may be implemented as a hybrid acoustic-and-optical sensor, or as a hybrid acoustic-and-optical sensor. In other embodiments, system 100 need not necessarily comprise an acoustic microphone. In yet other embodiments, system 100 may comprise optical microphone 102 and may not comprise any acoustic microphones, but may operate in conjunction with an external or a remote acoustic microphone.

System 100 may further comprise an optical beam aiming unit 103 (or tilting unit, or slanting unit, or positioning unit, or targeting unit, or directing unit), for example, implemented as a laser beam directing unit or aiming unit or other unit or module able to direct a transmitted optical beam (e.g., a transmitted laser beam) towards target 199, and/or able to fine-tune or modify the direction of such optical beam or laser beam. The directing or alignment of the optical beam or laser beam, towards the target 199, may be performed or achieved by using one or more suitable mechanisms.

In a first example, the optical microphone 101 may be fixedly mounted or attached or located at a first location or point (e.g., on a vehicular dashboard; on a frame of a screen of a laptop computer), and may generally point or be directed towards an estimated location or a general location of a human speaker that typically utilizes such device (e.g., aiming or targeting an estimated general location of a head of a driver in a vehicle; or aiming or targeting an estimated general location of a head of a laptop computer user); based on a fixed or pre-mounted angular slanting or positioning (e.g., performed by a maker of the vehicular dashboard or vehicle, or by the maker of the laptop computer).

In a second example, the optical microphone may be mounted on a wall of a lecture hall; and may be fixedly pointing or aiming its laser beam or its optical beam towards a general location of a stage or a podium in that lecture hall, in order to target a human speaker who is a lecturer.

In a third example, a motor or engine or robotic arm or other mechanical slanting unit 104 may be used, in order to align or slant or tilt the direction of the optical beam or laser beam of the optical microphone, towards an actual or an estimated location of a human speaker; optionally via a control interface that allows an administrator to command the movement or the slanting of the optical microphone towards a desired target (e.g., similar to the manner in which an optical camera or an imager or a video-recording device may be moved or tilted via a control interface, a pan-tilt-zoom (PTZ) interface, a robotic arm, or the like).

In a fourth example, an imager 105 or camera may be used in order to capture images or video of the surrounding of the optical microphone; and a face-recognition module or image-recognition module or a face-identifying module or other Computer Vision algorithm or module may be used in order to analyze the captured images or video and to determine the location of a human speaker (or a particular, desired, human speaker), and to cause the slanting or aiming or targeting or re-aligning of the optical beam to aim towards the identified human speaker. In a fifth example, a human speaker may be requested to wear or to carry a particular tag or token or article or object, having a pre-defined shape or color or pattern which is not typically found at random (e.g., tag or a button showing a green triangle within a yellow square); and an imager or camera may scan an area or a surrounding of system 100, may analyze the images or video to detect or to find the pre-defined tag, and may aim the optical microphone towards the tag, or towards a pre-defined or estimated offset distance from that tag (e.g., a predefined K degrees of slanting upwardly or vertically relative to the detected tag, if the human speaker is instructed to carry the tag or to wear the tag on his jacket pocket).

In a sixth example, an optics assembly 106 or optics arrangement (e.g., one or more mirrors, flat mirrors, concave mirrors, convex mirrors, lenses, prisms, beam-splitters, focusing elements, diffracting elements, diffractive elements, condensing elements, and/or other optics elements or optical elements) may be utilized in order to direct or aim the optical beam or laser beam towards a known or estimated or general location of a target or a speaker or a human face. The optics assembly may be fixedly mounted in advance (e.g., within a vehicle, in order to aim or target a vehicular optical sensor towards a general-location of a driver face), or may be dynamically adjusted or moved or tilted or slanted based on real-time information regarding the actual or estimated location of the speaker or his head (e.g., determined by using an imager, or determined by finding a Signal to Noise Ratio (SNR) value that is greater than a threshold value).

In a seventh example, the optical microphone may move or may "scan" a target area (e.g., by being moved or slanted via the mechanical slanting unit 104); and may remain at, or may go-back to, a particular direction in which the Signal to Noise Ratio (SNR) value was the maximal, or optimal, or greater than a threshold value.

In an eighth example, particularly if the human speaker is moving on a stage or moving in a room, or moves his face to different directions, the human speaker may be requested or required to stand at a particular spot or location in order to enable the system to efficiently work (e.g., similarly to the manner in which a singer or a performer is required to stand in proximity to a wired acoustic microphone which is mounted on a microphone stand); and/or the human speaker may be requested or required to look to a particular direction or to move his face to a particular direction (e.g., to look directly towards the optical microphone) in order for the system to efficiently operate (e.g., similar to the manner in which a singer or a performer may be requested to look at a camera or a video-recorder, or to put his mouth in close proximity to an acoustic microphone that he holds).

Other suitable mechanisms may be used to achieve or to fine-tune aiming, targeting and/or aligning of the optical beam with the desired target.

It is clarified that the optical microphone and/or the system of the present invention, need not be continuously aligned with the target or the human speaker, and need not necessarily "hit" the speaker continuously with laser beam or optical beam. Rather, in some embodiments, the present invention may operate only during time-periods in which the optical beam or laser beam actually "hits" the face of the speaker, or actually causes reflection of optical feedback from vibrating face-regions of the human speaker. In some embodiments, the system may operate or may efficiently operate at least during time period(s) in which the laser beam(s) or the optical signal(s) actually hit (or reach, or touch) the face or the mouth or the mouth-region of a speaker; and not in other time-periods or time-slots. In some embodiments, the system and/or method need not necessarily provide continuous speech enhancement or continuous noise reduction or continuous speech detection; but rather, in some embodiments the speech enhancement and/or noise reduction and/or speech detection may be achieved in those specific time-periods in which the laser beam(s) actually hit the face of the speaker and cause a reflection of optical feedback from vibrating surfaces or face-regions. In some embodiments, the system may operate only during such time periods (e.g., only a few minutes out of an hour; or only a few seconds out of a minute) in which such actual "hit" of the laser beam with the face-region is achieved. In other embodiments, continuous or substantially-continuous noise reduction and/or speech enhancement may be achieved; for example, in a vehicular system in which the laser beam is directed towards the location of the head or the face of the driver.

In accordance with the present invention, the optical microphone 101 may comprise a self-mix chamber or unit or a targeted vibrometer, and may utilize reflected optical feedback (e.g., reflected feedback of a transmitted laser beam) in order to remotely measure or estimate vibrations of the facial skin or facial-regions head-regions of a human speaker, utilizing a spectrum analyzer 107 in order to analyze the optical feedback with reference to the transmitted optical feedback, and utilizing a speech estimator unit 108 to estimate or extract a signal that corresponds to speech or audio that is generated or uttered by that human speaker.

The Applicants have realized that extraction of speech signal from the optical feedback may require solving one or more implementation issues. For example, the optical feedback may have a relatively low bandwidth (e.g., approximately 1.5 kilobits per second); momentary spackles or spackle-noise may distort or harm the optical feedback (e.g., cutting or eliminating or discarding some high frequencies); elasticity characteristics of the facial skin of the speaker may harm or distort the optical feedback (e.g., cutting or eliminating or discarding some high frequencies). However, the Applicants have also realized that different face-regions or head-regions of a human speaker, typically have different levels or values of skin elasticity; and that the problem may be mitigated or eliminated by dynamically mapping the face or the head or the face-area or head-area of the human speaker in order to detect, find, select and/or utilize, in a selective manner, the particular points or regions or areas that provide an SNR value that is optimal or maximal (or greater than a threshold value). The Applicants have realized that, for example, if the optical beam (e.g., laser beam) is aimed at the forehead of the speaker, then the SNR value is relatively low, and the speech detection or utterances detection is of a relatively low quality; whereas, if the optical beam (e.g., laser beam) is aimed at the cheek area, or the lips area, or the throat area, or the neck area, or the ear area, then the SNR value is relatively higher or high, and the speech detection or utterances detection is of a relatively high or higher quality, or is of sufficient quality for remote speech detection.

The Applicants have further realized that such particular face-regions or head-regions may have elasticity characteristics (or velocity and/or amplitude characteristics) that are more suitable or more useful for remote speech detection based on reflected optical feedback. The Applicants have further realized that such particular face-regions or head-regions may produce increased vibrations or more-useful vibrations, that may be more suitable or optimal for remote speech detection.

The Applicants have further realized that such particular face-regions or head-regions may operate as a sounding board or a sound box that may adequately reflect, via skin vibrations or surface vibrations, the optical signal in a manner that is most suitable (or more suitable than other regions) for the purpose of remote speech detection; due to their elasticity characteristics, and/or due to their three-dimensional structure, and/or due to their proximity or relative-proximity to the lips or to the mouth of the speaker. Such particular points or regions may thus provide improved or enhanced or better speech detection results, increased bandwidth of the optical feedback, and/or increased SNR.

Accordingly, system 100 may comprise an optical feedback signal bandwidth enhancer 125, which may operate to increase, enhance and/or improve the bandwidth and/or the Signal to Noise Ratio (SNR) of the received optical feedback that is reflected from the target 199, as described herein. It is clarified that the optical feedback signal bandwidth enhancer 125 does not directly operate to modify the bandwidth or the properties of the outgoing or the transmitted laser beam (or optical beam) on its way from the optical microphone (or the laser microphone) to the target 199; but rather, the optical feedback signal bandwidth enhancer 125 operates to improve or enhance the bandwidth of the incoming optical feedback signal that is reflected from the target and is received by the optical microphone or laser microphone (e.g., received at the self-mix chamber or self-mix unit of such optical microphone or laser microphone).

Figure 1B:
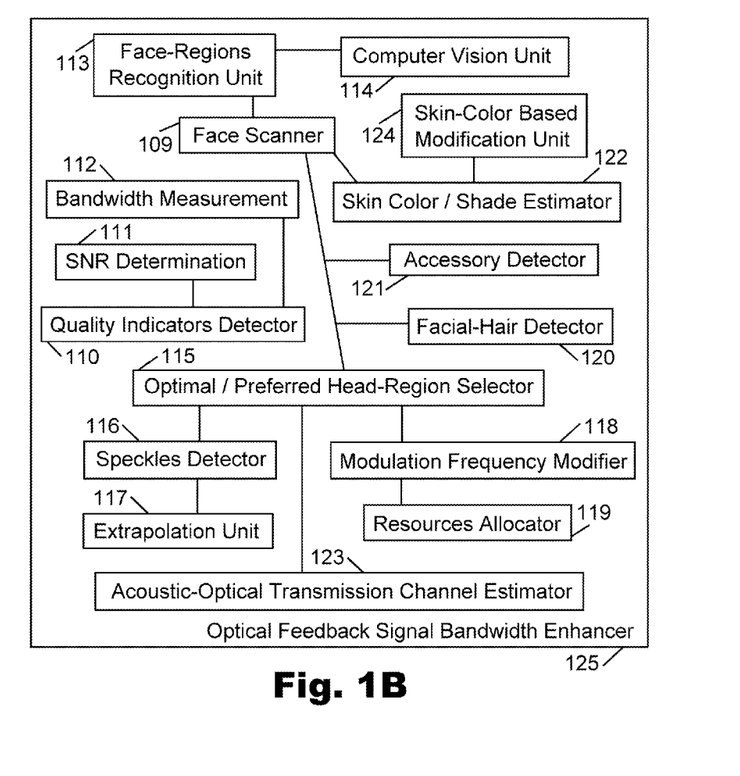
FIG. 1B is a schematic block-diagram illustration of an optical feedback signal bandwidth enhancer and its components, in accordance with some demonstrative embodiments of the present invention.

In order to not over-crowd FIG. 1A with components and elements, reference is made to FIG. 1B, which is a schematic block-diagram illustration of the optical feedback signal bandwidth enhancer 125 and its components, in accordance with some demonstrative embodiments of the present invention. It is clarified that some or all of the components that are shown in FIG. 1B, may be included within system 100 of FIG. 1A; and optionally, may be located or co-located within other modules or other units of system 100 FIG. 1A.

In accordance with the present invention, a Face Scanner unit 109 (or head scanner unit) may scan multiple regions or areas or points or locations of the target (e.g., the face of the human speaker), by directing or slanting or moving the optical beam (e.g., the laser beam) to hit or to teach such multiple regions or points; and a Quality Indicators Detector 110 may measure, estimate and/or determine one or more quality indicators or performance indicators that each such facial-area or face-area or head-region provides for purposes of remote speech recognition. For example, the Quality Indicators Detector 110 may comprise, or may operate in conjunction with, or may utilize, an SNR determination unit 111 which may determine the SNR of the optical feedback received by the optical microphone 101 from each such face-region or face-point; and/or a bandwidth measurement unit 112 to estimate or measure the bandwidth of the reflected optical signal that is reflected from each such face-region or face-point. In some embodiments, optionally, a face-regions recognition unit 113 may be utilized, for example in conjunction with the imager 105 and with a Computer Vision unit 114, in order to identify and/or recognize particular face-regions based on their shape and/or color and/or three-dimensional characteristics, thereby enabling the system to selectively aim towards a particular, identified, face-region that is pre-defined as a face-region that typically provides improved SNR and/or bandwidth (e.g., cheek area), and/or enabling the system to selectively aim away from face-regions that are pre-defined as typically providing poor optical feedback (e.g., forehead region).

In some embodiments, the outputs or the analysis results or the estimations, that are generated or performed by one, or some, or all of the following units: (a) the Quality Indicators Detector 110, (b) the SNR determination unit 111, (c) the bandwidth measurement unit 112, (d) the face-regions recognition unit 113, and/or (e) the computer vision unit 114, may be utilized (or may be fused together by utilizing a weighted formula that allocated a certain weight to each parameter); and an Optimal/Preferred Head-Region Selector 115 may utilize the combined or fused or weighted analysis results in order to select the optimal or preferred head-region or face-region that enables the optical microphone to obtain the highest-quality results of speech detection. Optionally, the Optimal/Preferred Head-Region Selector 115 may generate or may output a signal or a command, indicating to the optical microphone 101 to dynamically slant or to move or to tilt or aim the transmitted laser beam towards a particular direction, or at a certain degree or angle, in order to achieve the desired quality indicator values.

In some embodiments, optionally, the face-regions recognition unit 113 may suffice, optionally operating in conjunction with the Computer Vision unit 114, in order to detect or recognize particular face-regions (e.g., cheek); and in order to direct the transmitted laser beam or optical beam to aim towards a particular pre-defined face-region that is typically pre-defined as useful for remote speech detection; without necessarily utilizing on-the-fly estimation or measurement of SNR values and/or bandwidth across multiple face-regions or face-locations. This optional configuration may allow the system to have reduced costs, reduced form-factor or reduced footprint or reduced size or reduced volume, and/or greater speed of operation.

In some embodiments, the Optimal/Preferred Head-Region Selector 115 may take into account additional and/or other information; for example, a type of application that utilizes the optical microphone 101 or the system 100, or the final purpose or the ultimate purpose of utilizing the optical microphone 101 or the system 100. Such demonstrative use-purposes or use-goals or applications may comprise, for example: (a) actual detection of speech uttered by the human speaker, without utilizing any acoustic microphone; (b) assisting an acoustic microphone in capturing speech of the human speaker; (c) canceling or reducing noise(s) from an acoustic signal captured by an acoustic microphone; (d) filtering or dynamically filtering an acoustic signal; (e) dynamically constructing a digital filter for a captured acoustic signal, based on the optical feedback; (f) performing Speech Recognition (SR) or Automated Speech Recognition (ASR) for one or more purposes; (g) performing SR or ASR or speech-to-text conversion for dictation purposes; (h) performing SR or ASR or speech-to-text conversion for voice-commands or voice-control purposes; and/or other suitable applications or goals. The Applicants have realized that particular face-regions may be preferred for achieving adequate results or optimal results of a particular application type; and/or that some application-types may require a particular face-region optical feedback in order to adequately operate; and therefore, the Optimal/Preferred Head-Region Selector 115 may take this additional information into account.

In some embodiments, the Optimal/Preferred Head-Region Selector 115 may operate in conjunction with, or may comprise or may utilize, a facial-hair detector 120, which may estimate or detect or determine that a particular head-region or face-region is covered with hair (partially, or entirely, or in a manner that reduces or eliminates or hinders the ability to adequately perform remote speech detection). Similarly, an accessories detector 121 may estimate or determine that a particular head-region or face-region is covered or obstructed by an accessory or a wearable item (partially, or entirely, or in a manner that reduces or eliminates or hinders the ability to adequately perform remote speech detection), such as glasses, sunglasses, reading glasses, a scarf that hides portions of the face, a hat, head-gear, or the like. In a demonstrative embodiment, the system may detect or determine (e.g., based on analysis of an image of the target) that one or more head-regions or face-regions are covered with or hidden by hair and/or an accessory, and may thus trigger the Optimal/Preferred Head-Region Selector 115 to select another or a different head-region towards which the optical microphone (e.g., the laser microphone, the laser beam) should aim.

In some embodiments, the facial-hear detector 120 may autonomously detect or estimate that a face-region is entirely covered with hair, without necessarily using any images or any image analysis; for example, based on a detection or an estimation that the optical feedback is null, or that the optical feedback is a constant or fixed value or signal, or is pseudo-random signal or noise or "white noise", or that the optical feedback indicates a zero-speed motion or a zero-speed vibration of a zero-speed vibration of the target area being hit by the laser beam or the optical beam. This information may enable the facial-hear detector 120 to determine that a face-region is entirely covered with hair, thereby triggering the Optimal/Preferred Head-Region Selector 115 to select another or a different head-region towards which the optical microphone (e.g., the laser microphone, the laser beam) should aim.

In some embodiments, the accessory detector 121 may autonomously detect or estimate that a face-region is entirely covered with or obstructed by an accessory, without necessarily using any images or any image analysis; for example, based on a detection or an estimation that the optical feedback is null, or that the optical feedback is a constant or fixed value or signal, or is pseudo-random signal or noise or "white noise", or that the optical feedback indicates a zero-speed motion or a zero-speed vibration of the target area being hit by the laser beam or the optical beam. This information may enable the accessory detector 121 to determine that a face-region is entirely covered with or obstructed by an accessory, thereby triggering the Optimal/Preferred Head-Region Selector 115 to select another or a different head-region towards which the optical microphone (e.g., the laser microphone, the laser beam) should aim.

In some embodiments the facial-hair detector 120 may be able to determine that a face-region is only partially covered or partially obstructed by hair; for example, by a short beard or a fresh beard, or by male skin that was not shaven for 1 or 2 or 3 or 4 days, or the like. In such situation, the laser beam (or optical beam) may partially hit the skin (which may vibrate) and may partially hit hair or beard (which may not vibrate, or which may vibrate differently). The facial-hair detector 120 may detect or estimate that such situation exists, for example, since two "peaks" may be detected by the spectrum analyzer 107 in the spectrum of the optical feedback signal. The facial-hair detector 120, in conjunction with the spectrum analyzer 107, may be able to differentiate between the two (or more) "peaks" identified in the optical feedback signal, based on their consistency and/or based on their characteristics and/or based on the data that can still be extracted from each such "signal peak". Based on such differentiation, or based on an inability to successfully differentiate, the facial-hair detector 120 may signal to the Optimal/Preferred Head-Region Selector 115 whether or not it is desired or it is required to re-target or to aim the optical beam (or laser beam) towards a different face-region or head-region of the target, or whether the current aiming and targeting is sufficient for the purposes of the application that utilizes the system 100.

The Applicants have realized that in some embodiments, a darker skin of the target may capture and may keep therein a greater amount of a laser beam (or optical beam) that hits the target, thereby reflecting back a smaller amount of the optical signal; which in turn translates to a weaker or reduced-bandwidth optical feedback signal.

The Applicants have realized that in some embodiments, a lighter or brighter skin of the target may keep therein a smaller amount of a laser beam (or optical beam) that hits the target, thereby reflecting back a greater amount of the optical signal; which in turn translates to a stronger or increased-bandwidth optical feedback signal.

Accordingly, in some embodiments, a skin color/shade estimator 122 may operate to detect or measure or estimate the skin-color or skin-shade of the face of the target, in order to possibly modify the operational properties of one or more components of system 100 based on such detection. The detection may be based, for example, on image analysis of an image of the target 199. Based on the detection or estimation of skin color or skin shade, a skin-color based modification unit 124 may command or may trigger other components of system 100 to modify their operational parameter(s), for example: the optical microphone 101 (or laser microphone) may modify the amplitude and/or modulation and/or frequency and/or intensity of the optical beam (or laser beam) transmitted towards the target 199; increased processing resources and/or computing resources may be allocated for estimation or analysis of the reflected optical signal; threshold values that are utilized for decision-making or for speech detection may be modified or may be reduced; and/or other operational modifications may be commanded, triggered, and performed.

Some embodiments may utilize a speckles detector unit 116, to analyze the optical feedback that is reflected from a particular face-region or from multiple face-regions, and to detect or determine or estimate that some or part of the reflected signal suffers from inaccuracies due to speckles that may occur on the skin of the face or head when the optical beam (e.g., laser beam) hits. Upon estimation or detection of speckles or speckles-related deficiencies in the optical signals, an extrapolation unit 117 may extrapolate or may estimate the portion(s) of the optical feedback signal, which was lost due to speckles, based on the optical feedback that was actually received. In some embodiments, the extrapolation unit 117 may operate, or may operate adequately, or may only operate, if or when the rate of the speckles-related deficiencies is lower than a pre-defined threshold value (e.g., lower than 5 milliseconds).

In some embodiments, the bandwidth and/or the SNR (or other quality indicators) of the optical feedback signal and/or of the self-mix signal, may be improved or enhanced by modifying or increasing the modulation rate of each saw-tooth in the self-mix saw-tooth wave signal (e.g., increasing the modulation from 3 KHz, to approximately 5 or 8 or 10 or 12 or 15 or 18 KHz). For example, the bandwidth measurement unit 112 may estimate or may measure a bandwidth (of the optical feedback signal, or of the self-mix signal) that is lower than a threshold value (e.g., a threshold value that is required in order to adequately meet the requirements of a particular application or device that utilizes the optical microphone 101); and may trigger or may command a Modulation Frequency modifier 118 to modify (e.g., to increase) the modulation rate of the self-mix signal. This may be performed in order to enable the spectrum analyzer 107 and/or the system 100 to obtain and to utilize information or data at relatively-higher frequencies. In some embodiments, the increase in modulation frequency may require additional power resources, processing resources, memory resources and/or computing resources; and a resources allocator unit 119 may selectively allocate or re-allocate these (or other) resources of system 100 in order to obtain optimal results, since an increase in the utilization of system resources for the purpose of increasing the modulation frequency of the self-mix signal, may (in some implementations) be on expense of processes that estimate signal or that process or analyze the spectrum. The resources allocator unit 119 may selectively modify the allocation of system resources, in order to balance between (a) the improvement to bandwidth that may potentially be obtained by increasing the modulation frequency by utilizing additional system resources, and (b) the potential degradation in the quality of estimation of the signal due to reduced availability of system resources for this purpose. The resources allocator unit 119 may thus operate to ensure that the optical feedback signal is as rich as possible with information, including time-domain data and frequency-domain data.

The Applicants have realized that some vowels, consonants, syllables, words, speech-units or speech-items, or other utterances or phonetic units, may sound differently or may be detected differently, if the optical detection is performed at different face-regions or face-points. In a demonstrative example, a nasal consonant (e.g., the consonant "n" in the word "not"), which is produced at or near the nasal area or the nose, may sound differently or may be differently detected, in relation to the distance between from the nose of the speaker and the detection-point that is hit by the laser beam (or optical beam). A transmission channel between the acoustic signal and the optical feedback may change from one point to another point along the face of the human speaker. This transmission channel may be estimated by an acoustic-optical transmission channel estimator 123, and the construction or estimation of the acoustic information may be modified or corrected or fine-tuned by taking into account the information indicating the distance between the optical-hitting-point and the nose (or the face-region responsible for the utterance, such as the throat, the lips, or the like).

Some embodiments of the present invention may comprise an optical microphone or laser microphone or a laser-based microphone, or optical sensor or laser sensor or laser-based sensor, which utilizes multiple lasers or multiple laser beams or multiple laser transmitters, in conjunction with a single laser drive component and/or a single laser receiver component, thereby increasing or improving the efficiency of self-mix techniques or module or chamber (or self-mix interferometery techniques or module or chamber) utilized by such optical or laser-based microphone or sensor.

In some embodiments of the present invention, which may optionally utilize a laser microphone or optical microphone, the laser beam or optical beam may be directed to an estimated general-location of the speaker; or to a pre-defined target area or target region in which a speaker may be located, or in which a speaker is estimated to be located. For example, the laser source may be placed inside a vehicle, and may be targeting the general location at which a head of the driver is typically located. In other embodiments, a system may optionally comprise one or more modules that may, for example, locate or find or detect or track, a face or a mouth or a head of a person (or of a speaker), for example, based on image recognition, based on video analysis or image analysis, based on a pre-defined item or object (e.g., the speaker may wear a particular item, such as a hat or a collar having a particular shape and/or color and/or characteristics), or the like. In some embodiments, the laser source(s) may be static or fixed, and may fixedly point towards a general-location or towards an estimated-location of a speaker. In other embodiments, the laser source(s) may be non-fixed, or may be able to automatically move and/or change their orientation, for example, to track or to aim towards a general-location or an estimated-location or a precise-location of a speaker. In some embodiments, multiple laser source(s) may be used in parallel, and they may be fixed and/or moving.

In some demonstrative embodiments of the present invention, which may optionally utilize a laser microphone or optical microphone, the system and method may efficiently operate at least during time period(s) in which the laser beam(s) or the optical signal(s) actually hit (or reach, or touch) the face or the mouth or the mouth-region of a speaker. In some embodiments, the system and/or method need not necessarily provide continuous speech enhancement or continuous noise reduction; but rather, in some embodiments the speech enhancement and/or noise reduction may be achieved in those time-periods in which the laser beam(s) actually hit the face of the speaker. In other embodiments, continuous or substantially-continuous noise reduction and/or speech enhancement may be achieved; for example, in a vehicular system in which the laser beam is directed towards the location of the head or the face of the driver.

Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

Some embodiments of the present invention may include a device comprising: a laser microphone to transmit a laser beam towards a human speaker, to receive an optical feedback signal reflected back from said human speaker, and to perform self-mixing interferometry between the transmitted laser beam and the received optical feedback signal; an optical feedback signal bandwidth enhancer to enhance a bandwidth of the optical feedback signal.

In some embodiments, the optical feedback signal bandwidth enhancer comprises: an imager to capture an image of said human speaker; an image analysis unit to determine which particular body-region of the human speaker is hit by the transmitted laser beam; an optical beam aiming unit to selectively modify an aiming of the transmitted laser beam, from hitting a currently-hit body region of the human speaker, to hitting another body region of the human speaker.

In some embodiments, the optical feedback signal bandwidth enhancer comprises: an imager to capture an image of said human speaker; an image analysis unit to determine which particular face-region of the human speaker is hit by the transmitted laser beam; an optical beam aiming unit to selectively modify an aiming of the transmitted laser beam, from hitting a currently-hit body region of the human speaker, to hitting another face region of the human speaker.

In some embodiments, the optical feedback signal bandwidth enhancer comprises: a face-region recognition unit to determine that the transmitted laser beam is hitting a first body region that is associated with lower optical reflective qualities; an optical beam aiming unit to selectively modify an aiming of the transmitted laser beam, from hitting said first body region of the human speaker, to hitting another body region of the human speaker that is associated with higher optical reflective qualities.

In some embodiments, the optical feedback signal bandwidth enhancer comprises: a Signal to Noise Ratio (SNR) determination unit, to determine a SNR value of the received optical feedback signal; a head-region selector unit to modify an aiming of the transmitted laser beam, from (i) a first head-region that reflects the laser beam by producing an optical feedback signal having a first SNR value, to (ii) a second head-region that reflects the laser beam by producing an optical feedback signal having a second, greater, SNR value.

In some embodiments, the head-region selector unit comprises a laser beam re-aiming unit to re-aim the transmitted laser beam towards said second head-region by mechanically slanting a laser transmitter of said laser microphone.

In some embodiments, the head-region selector unit comprises a laser beam re-aiming unit to re-aim the transmitted laser beam towards said second head-region by utilizing an optics element for slanting the laser beam transmitted by said laser microphone.

In some embodiments, the head-region selector unit is to modify the aiming of the transmitted beam if it is determined that a currently-hit face-region of the human speaker reflects the laser beam by producing an optical feedback signal that is insufficient for performing remote speech detection.

In some embodiments, the optical feedback signal bandwidth enhancer comprises: an optical feedback signal bandwidth estimator, to estimate a bandwidth of the received optical feedback signal; a head-region selector unit to modify an aiming of the transmitted laser beam, from (i) a first head-region that reflects the laser beam by producing an optical feedback signal having a first bandwidth value, to (ii) a second head-region that reflects the laser beam by producing an optical feedback signal having a second, greater, bandwidth value.

In some embodiments, the head-region selector unit comprises a laser beam re-aiming unit to re-aim the transmitted laser beam towards said second head-region by mechanically slanting a laser transmitter of said laser microphone.

In some embodiments, the head-region selector unit comprises a laser beam re-aiming unit to re-aim the transmitted laser beam towards said second head-region by utilizing an optics element for slanting the laser beam transmitted by said laser microphone.

In some embodiments, the head-region selector unit is to modify the aiming of the transmitted beam if it is determined that a currently-hit face-region of the human speaker reflects the laser beam by producing an optical feedback signal that is insufficient for performing remote speech detection.

In some embodiments, the optical feedback signal bandwidth enhancer comprises: an imager to capture an image of said human speaker; a computer vision unit to process said image and to identify which face-region of the human speaker is hit by the laser beam; a head-region selector unit to modify an aiming of the transmitted laser beam, from (i) the face-region that is currently hit by the laser bit, to (ii) another face-region of the human speaker.

In some embodiments, the head-region selector unit is to modify the aiming of the transmitted beam if it is determined that a currently-hit face-region of the human speaker reflects the laser beam by producing an optical feedback signal that is insufficient for performing remote speech detection.

In some embodiments, the device comprises: a speckles detector unit to determine that the received optical feedback signal is degraded below a threshold quality value, due to speckle noise that occurs in the face-region that is currently hit by the laser transmitter; an extrapolation unit to extrapolate information, that is missing from the received optical feedback signal due to said speckle noise, based on information that is included in the received optical feedback signal.

In some embodiments, the device comprises: a speckles detector unit to determine that the received optical feedback signal is degraded below a threshold quality value, due to speckle noise that occurs in the face-region that is currently hit by the laser transmitter; a modulation frequency modifier to modify a modulation frequency of the received optical feedback signal in order to correct signal deficiencies that result from said speckle noise.

In some embodiments, the optical feedback signal bandwidth enhancer comprises: a modulation frequency modifier to modify a modulation frequency of the received optical feedback signal in order to correct signal deficiencies that result from said laser beam hitting a face-region that poorly reflects said laser beam.

In some embodiments, the optical feedback signal bandwidth enhancer comprises: a modulation frequency modifier to modify a modulation frequency of the received optical feedback signal in order to correct signal deficiencies that result from said laser beam hitting a face-region that does not sufficiently vibrate upon speech utterance by said human speaker.

In some embodiments, the optical feedback signal bandwidth enhancer comprises: an accessory detector to detect that a body region of the human speaker, that is hit by the transmitted laser beam, is obstructed by an accessory article; an optical beam aiming unit to selectively modify an aiming of the transmitted laser beam, from hitting said first body region of the human speaker that is obstructed by the accessory article, to hitting another body region of the human speaker that is not obstructed by said accessory article.

In some embodiments, the accessory detector is to detect an obstruction by said accessory article based on detecting a generally null signal as incoming optical feedback signal.

In some embodiments, the accessory detector is to detect an obstruction by said accessory article based on detecting a generally white noise as incoming optical feedback signal.

In some embodiments, the accessory detector is to detect an obstruction by said accessory article based on image analysis of a captured image of said human speaker.

In some embodiments, the optical feedback signal bandwidth enhancer comprises: a facial-hair detector to detect that a face-region of the human speaker, that is hit by the transmitted laser beam, is obstructed by facial hair; an optical beam aiming unit to selectively modify an aiming of the transmitted laser beam, from hitting said face-region region of the human speaker that is obstructed by the facial hair, to hitting another body region of the human speaker that is not obstructed by said facial hair.

In some embodiments, the facial-hair detector is to detect an obstruction of said face-region by said facial-hair based on detecting a generally null signal as incoming optical feedback signal.

In some embodiments, the facial-hair detector is to detect an obstruction of said face-region by said facial-hair based on detecting a generally white noise as incoming optical feedback signal.

In some embodiments, the facial-hair detector is to detect an obstruction of said facial-region by said facial-hair based on image analysis of a captured image of said human speaker.

In some embodiments, the optical feedback signal bandwidth enhancer comprises: a facial-hair detector to detect that a face region of the human speaker, that is hit by the transmitted laser beam, is partially obstructed by facial hair which only partially obstructs a skin of the human speaker, and to detect that said face-region alternates between reflecting and not-reflecting the transmitted laser beam; an optical beam aiming unit to selectively modify an aiming of the transmitted laser beam, from hitting said first body region of the human speaker that is partially obstructed by the facial hair, to hitting another body region of the human speaker that is not obstructed by said facial hair.

In some embodiments, the optical feedback signal bandwidth enhancer comprises: a facial-hair detector to detect that a face region of the human speaker, that is hit by the transmitted laser beam, is partially obstructed by facial hair which only partially obstructs a skin of the human speaker, and to detect that said face-region alternates between reflecting and not-reflecting the transmitted laser beam; wherein the facial-hair detector performs detections by taking into account a spectrum analysis of the received optical feedback signal which indicates at least two different peaks in a spectrum of the received optical feedback signal, wherein at least one peak corresponds to optical feedback signal reflected from skin, and wherein at least another peak corresponds to optical feedback signal reflected from hair; an optical beam aiming unit to selectively modify an aiming of the transmitted laser beam, from hitting said first body region of the human speaker that is partially obstructed by the facial hair, to hitting another body region of the human speaker that is not obstructed by said facial hair.

In some embodiments, the optical feedback signal bandwidth enhancer comprises: a skin-color estimator to estimate a skin color of said human speaker, based on a captured image of said human speaker; a skin-color based modification unit, to modify an operational parameter of the laser microphone, based on the estimated skin color of said human speaker.

In some embodiments, the optical feedback signal bandwidth enhancer comprises: a skin-color estimator to estimate a skin color of said human speaker, based on a captured image of said human speaker; a skin-color based modification unit, wherein, in response to an estimation that the skin color of said human speaker is darker than a threshold shade value, the skin-color based modification unit is to decrease a threshold value of a remote speech detection algorithm that remotely detects speech of the human speaker based on the received optical feedback signal.

In some embodiments, the optical feedback signal bandwidth enhancer comprises: a skin-color estimator to estimate a skin color of said human speaker, based on a captured image of said human speaker; a skin-color based modification unit, wherein, in response to an estimation that the skin color of said human speaker is darker than a threshold shade value, the skin-color based modification unit is to increase an allocation of processing resources that are allocated to a remote speech detection algorithm that remotely detects speech of the human speaker based on the received optical feedback signal.

In some embodiments, the optical feedback signal bandwidth enhancer comprises: a skin-color estimator to estimate a skin color of said human speaker, based on a captured image of said human speaker; a skin-color based modification unit, wherein, in response to an estimation that the skin color of said human speaker is lighter than a threshold shade value, the skin-color based modification unit is to decrease an allocation of processing resources that are allocated to a remote speech detection algorithm that remotely detects speech of the human speaker based on the received optical feedback signal.

In some embodiments, the optical feedback signal bandwidth enhancer comprises: a skin-color estimator to estimate a skin color of said human speaker, based on a captured image of said human speaker; a skin-color based modification unit, wherein, in response to an estimation that the skin color of said human speaker is darker than a threshold shade value, the skin-color based modification unit is modify an aiming of the laser beam transmitted by the laser microphone, from hitting a first head-region of the human speaker, to hitting a second, different, head-region of the human speaker.

In some embodiments, the optical feedback signal bandwidth enhancer comprises: an acoustic-optical transmission channel estimator, to estimate one or more characteristics of a transmission channel that exists between: (i) a first head-region in which an utterance is produced, and (ii) a second, different, head-region that is hit by the laser beam; a remote speech detection unit, to perform remote speech detection of said utterance of said human speaker, based on: (a) the received optical feedback signal, and (b) the estimated characteristics of said transmission channel that exists between (i) the first head-region in which an utterance is produced, and (ii) the second, different, head-region that is hit by the laser beam.

In some embodiments, the device comprises: a remote speech detection unit, to perform remote speech detection of said utterance of said human speaker, based exclusively on the received optical feedback signal, wherein the device is an optical sensor that does not comprise an acoustic microphone, and wherein the remote speech detection unit does not utilize any captured acoustic signal.

In some embodiments, the device comprises: a remote speech detection unit, to perform remote speech detection of said utterance of said human speaker, based exclusively on the received optical feedback signal, wherein the device is an optical sensor that is not in physical contact with said human speaker, and that does not comprise an acoustic microphone, and wherein the remote speech detection unit does not utilize any captured acoustic signal.

In some embodiments, the device comprises a hybrid acoustic-and-optical sensor which includes at least: an acoustic microphone able to capture acoustic signals generated by said human speaker; a processor to enhance the acoustic signals, that are captured by said acoustic microphone, based on vibrations of facial-area of the human speaker that are sensed remotely by the laser microphone.

In some embodiments, the device comprises a hybrid acoustic-and-optical sensor which includes at least: an acoustic microphone able to capture acoustic signals generated by said human speaker; a processor to dynamically construct a digital filter for enhancing the acoustic signals, that are captured by said acoustic microphone, based on vibrations of facial-area of the human speaker that are sensed remotely by the laser microphone.

In some embodiments, the device is an optical sensor which is integrally embedded within a vehicle.

In some embodiments, the device is an optical sensor which is embedded in an electronic device selected from the group consisting of: a smartphone, a tablet, a laptop computer.

The system(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules. The system(s) of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

Some embodiments of the present invention may comprise, or may utilize, or may be utilized in conjunction with, one or more elements, units, devices, systems and/or methods that are described in U.S. Pat. No. 7,775,113, titled "Sound sources separation and monitoring using directional coherent electromagnetic waves", which is hereby incorporated by reference in its entirety.

Some embodiments of the present invention may comprise, or may utilize, or may be utilized in conjunction with, one or more elements, units, devices, systems and/or methods that are described in U.S. Pat. No. 8,286,493, titled "Sound sources separation and monitoring using directional coherent electromagnetic waves", which is hereby incorporated by reference in its entirety.

Some embodiments of the present invention may comprise, or may utilize, or may be utilized in conjunction with, one or more elements, units, devices, systems and/or methods that are described in U.S. Pat. No. 8,949,118, titled "System and method for robust estimation and tracking the fundamental frequency of pseudo periodic signals in the presence of noise", which is hereby incorporated by reference in its entirety.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A device comprising:
a laser microphone to transmit a laser beam towards a human speaker, to receive an optical feedback signal reflected back from said human speaker, and to perform self-mixing interferometry between the transmitted laser beam and the received optical feedback signal;
an optical feedback signal bandwidth enhancer to enhance a bandwidth of the optical feedback signal;
wherein the optical feedback signal bandwidth enhancer comprises:
an imager to capture an image of said human speaker;
an image analysis unit to determine which particular body-region of the human speaker is hit by the transmitted laser beam;
an optical beam aiming unit to selectively modify an aiming of the transmitted laser beam, from hitting a currently-hit body region of the human speaker, to hitting another body region of the human speaker.

2. A device comprising:
a laser microphone to transmit a laser beam towards a human speaker, to receive an optical feedback signal reflected back from said human speaker, and to perform self-mixing interferometry between the transmitted laser beam and the received optical feedback signal;
an optical feedback signal bandwidth enhancer to enhance a bandwidth of the optical feedback signal;
wherein the optical feedback signal bandwidth enhancer comprises:
an imager to capture an image of said human speaker;
an image analysis unit to determine which particular face-region of the human speaker is hit by the transmitted laser beam;
an optical beam aiming unit to selectively modify an aiming of the transmitted laser beam, from hitting a currently-hit body region of the human speaker, to hitting another face region of the human speaker.

3. A device comprising:
a laser microphone to transmit a laser beam towards a human speaker, to receive an optical feedback signal reflected back from said human speaker, and to perform self-mixing interferometry between the transmitted laser beam and the received optical feedback signal;
an optical feedback signal bandwidth enhancer to enhance a bandwidth of the optical feedback signal;
wherein the optical feedback signal bandwidth enhancer comprises:
a face-region recognition unit to determine that the transmitted laser beam is hitting a first body region that is associated with lower optical reflective qualities;
an optical beam aiming unit to selectively modify an aiming of the transmitted laser beam, from hitting said first body region of the human speaker, to hitting another body region of the human speaker that is associated with higher optical reflective qualities.

4. A device comprising:
a laser microphone to transmit a laser beam towards a human speaker, to receive an optical feedback signal reflected back from said human speaker, and to perform self-mixing interferometry between the transmitted laser beam and the received optical feedback signal;
an optical feedback signal bandwidth enhancer to enhance a bandwidth of the optical feedback signal;
wherein the optical feedback signal bandwidth enhancer comprises:
a Signal to Noise Ratio (SNR) determination unit, to determine a SNR value of the received optical feedback signal;
a head-region selector unit to modify an aiming of the transmitted laser beam, from (i) a first head-region that reflects the laser beam by producing an optical feedback signal having a first SNR value, to (ii) a second head-region that reflects the laser beam by producing an optical feedback signal having a second, greater, SNR value.

5. The device of claim 4, wherein the head-region selector unit comprises a laser beam re-aiming unit to re-aim the transmitted laser beam towards said second head-region by mechanically slanting a laser transmitter of said laser microphone.

6. The device of claim 4, wherein the head-region selector unit comprises a laser beam re-aiming unit to re-aim the transmitted laser beam towards said second head-region by utilizing an optics element for slanting the laser beam transmitted by said laser microphone.

7. The device of claim 4, wherein the head-region selector unit is to modify the aiming of the transmitted beam if it is determined that a currently-hit face-region of the human speaker reflects the laser beam by producing an optical feedback signal that is insufficient for performing remote speech detection.

8. A device comprising:
a laser microphone to transmit a laser beam towards a human speaker, to receive an optical feedback signal reflected back from said human speaker, and to perform self-mixing interferometry between the transmitted laser beam and the received optical feedback signal;
an optical feedback signal bandwidth enhancer to enhance a bandwidth of the optical feedback signal;
wherein the optical feedback signal bandwidth enhancer comprises:
an optical feedback signal bandwidth estimator, to estimate a bandwidth of the received optical feedback signal;
a head-region selector unit to modify an aiming of the transmitted laser beam, from (i) a first head-region that reflects the laser beam by producing an optical feedback signal having a first bandwidth value, to (ii) a second head-region that reflects the laser beam by producing an optical feedback signal having a second, greater, bandwidth value.

9. The device of claim 8, wherein the head-region selector unit comprises a laser beam re-aiming unit to re-aim the transmitted laser beam towards said second head-region by mechanically slanting a laser transmitter of said laser microphone.

10. The device of claim 8, wherein the head-region selector unit comprises a laser beam re-aiming unit to re-aim the transmitted laser beam towards said second head-region by utilizing an optics element for slanting the laser beam transmitted by said laser microphone.

11. The device of claim 8, wherein the head-region selector unit is to modify the aiming of the transmitted beam if it is determined that a currently-hit face-region of the human speaker reflects the laser beam by producing an optical feedback signal that is insufficient for performing remote speech detection.

12. A device comprising:
a laser microphone to transmit a laser beam towards a human speaker, to receive an optical feedback signal reflected back from said human speaker, and to perform self-mixing interferometry between the transmitted laser beam and the received optical feedback signal;
an optical feedback signal bandwidth enhancer to enhance a bandwidth of the optical feedback signal;
wherein the optical feedback signal bandwidth enhancer comprises:
an imager to capture an image of said human speaker;
a computer vision unit to process said image and to identify which face-region of the human speaker is hit by the laser beam;
a head-region selector unit to modify an aiming of the transmitted laser beam, from (i) the face-region that is currently hit by the laser bit, to (ii) another face-region of the human speaker.

13. The device of claim 12, wherein the head-region selector unit is to modify the aiming of the transmitted beam if it is determined that a currently-hit face-region of the human speaker reflects the laser beam by producing an optical feedback signal that is insufficient for performing remote speech detection.

14. A device comprising:
a laser microphone to transmit a laser beam towards a human speaker, to receive an optical feedback signal reflected back from said human speaker, and to perform self-mixing interferometry between the transmitted laser beam and the received optical feedback signal;
an optical feedback signal bandwidth enhancer to enhance a bandwidth of the optical feedback signal;
a speckles detector unit to determine that the received optical feedback signal is degraded below a threshold quality value, due to speckle noise that occurs in the face-region that is currently hit by the laser transmitter;
an extrapolation unit to extrapolate information, that is missing from the received optical feedback signal due to said speckle noise, based on information that is included in the received optical feedback signal.

15. A device comprising:
a laser microphone to transmit a laser beam towards a human speaker, to receive an optical feedback signal reflected back from said human speaker, and to perform self-mixing interferometry between the transmitted laser beam and the received optical feedback signal;
an optical feedback signal bandwidth enhancer to enhance a bandwidth of the optical feedback signal;
a speckles detector unit to determine that the received optical feedback signal is degraded below a threshold quality value, due to speckle noise that occurs in the face-region that is currently hit by the laser transmitter;
a modulation frequency modifier to modify a modulation frequency of the received optical feedback signal in order to correct signal deficiencies that result from said speckle noise.

16. A device comprising:
a laser microphone to transmit a laser beam towards a human speaker, to receive an optical feedback signal reflected back from said human speaker, and to perform self-mixing interferometry between the transmitted laser beam and the received optical feedback signal;
an optical feedback signal bandwidth enhancer to enhance a bandwidth of the optical feedback signal;
wherein the optical feedback signal bandwidth enhancer comprises:
a modulation frequency modifier to modify a modulation frequency of the received optical feedback signal in order to correct signal deficiencies that result from said laser beam hitting a face-region that poorly reflects said laser beam.

17. A device comprising:
a laser microphone to transmit a laser beam towards a human speaker, to receive an optical feedback signal reflected back from said human speaker, and to perform self-mixing interferometry between the transmitted laser beam and the received optical feedback signal;
an optical feedback signal bandwidth enhancer to enhance a bandwidth of the optical feedback signal;
wherein the optical feedback signal bandwidth enhancer comprises:
a modulation frequency modifier to modify a modulation frequency of the received optical feedback signal in order to correct signal deficiencies that result from said laser beam hitting a face-region that does not sufficiently vibrate upon speech utterance by said human speaker.

18. The device of claim 14, wherein the device is an optical sensor which is integrally embedded within a vehicle.

19. The device of claim 15, wherein the device is an optical sensor which is embedded in an electronic device selected from the group consisting of: a smartphone, a tablet, a laptop computer.

20. The device of claim 16, wherein the device is an optical sensor which is embedded in an electronic device selected from the group consisting of: a smartphone, a tablet, a laptop computer.

* * * * *